United States Patent [19]

Langan

[11] Patent Number: 4,593,277

[45] Date of Patent: Jun. 3, 1986

[54] APPARATUS AND METHOD FOR SENSING EXCESSIVE WEAR OR FAILURE OF MACHINE TOOL

[75] Inventor: John D. Langan, Goleta, Calif.

[73] Assignee: Langan Engineering, Inc., Goleta, Calif.

[21] Appl. No.: 570,793

[22] Filed: Jan. 16, 1984

[51] Int. Cl.⁴ ............................................. G08B 21/00
[52] U.S. Cl. ..................................... 340/680; 340/679; 73/104
[58] Field of Search .................. 340/679, 680; 73/104; 83/62, 62.1; 407/120; 408/6, 11, 710; 409/134, 187, 194

[56] References Cited

U.S. PATENT DOCUMENTS

| 4,325,163 | 4/1982 | Mattson et al. | 15/330 |
| 4,332,161 | 6/1982 | Kakino | 73/104 |
| 4,471,444 | 9/1984 | Yee et al. | 73/104 |

FOREIGN PATENT DOCUMENTS

| 54-154880 | 12/1979 | Japan | 340/680 |
| 1349700 | 4/1974 | United Kingdom . | |

Primary Examiner—James L. Rowland
Assistant Examiner—Jeffery A. Hofsass
Attorney, Agent, or Firm—Edward A. Sokolski

[57] ABSTRACT

A channel is formed in the body of a machine tool holder, this channel extending to the area where the tool is working on the workpiece. A pneumatic flow away from the tool is established by means of a vacuum source connected to the channel. A pressure transducer is connected to the channel so that it is capable of sensing the pneumatic pressure therein. The transducer produces an electrical output in accordance with the sensed pressure, this electrical output being suitably processed to provide a control signal capable of shutting down the operation of the machine tool and simultaneously providing a warning signal. With the incipient failure of the tool, as evidenced by either excessive heating of the tool or the production of filamentary chips from the tool (this occurring when the outer hardened coating of the tool wears off), an abrupt change in the pneumatic pressure in the channel occurs resulting in the generation of a control signal which both shuts down the machine tool operation and provides a warning signal to the operator. A complete failure, such as breakage of the tool, will also cause a pressure change producing such a control signal.

15 Claims, 8 Drawing Figures

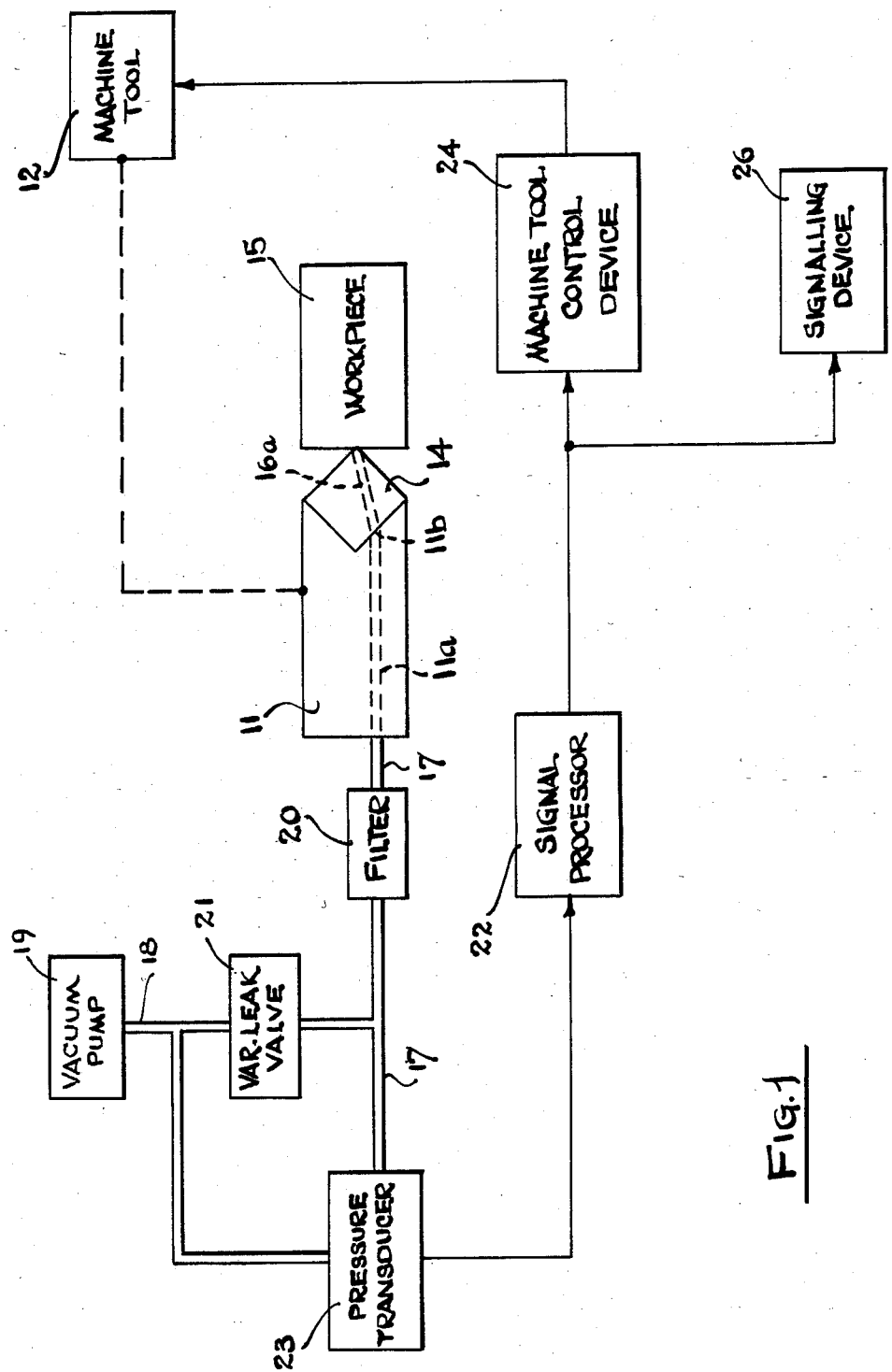

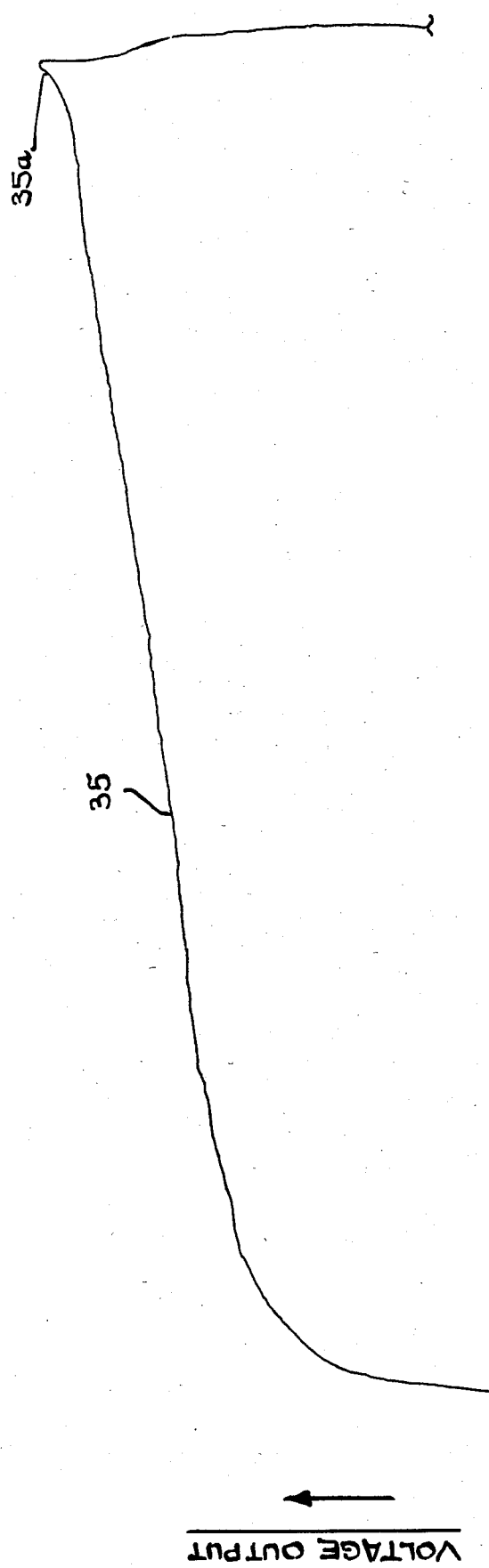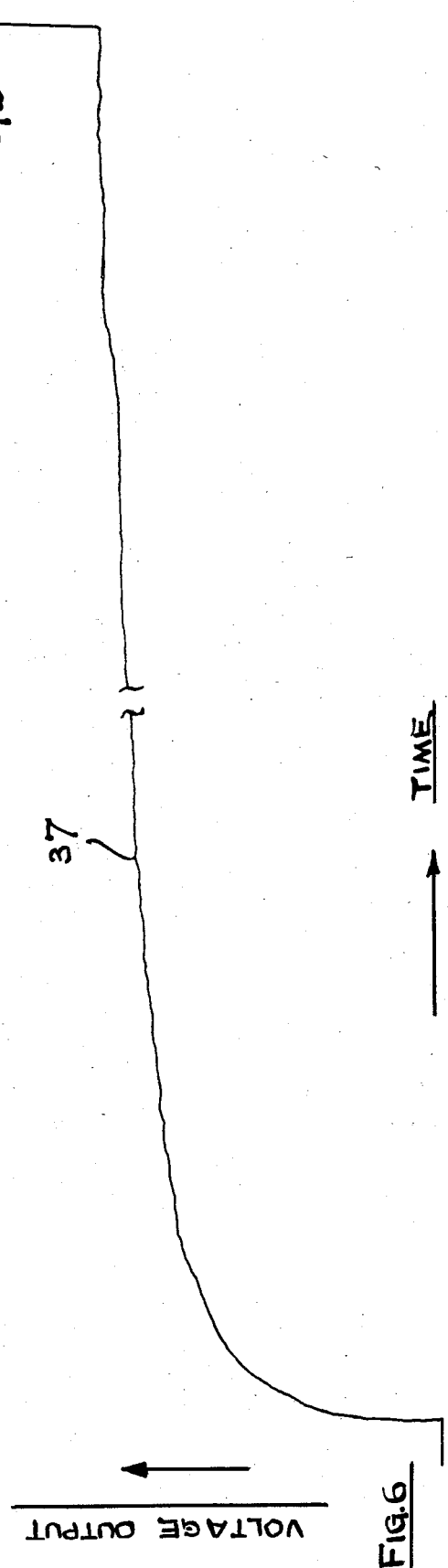

APPARATUS AND METHOD FOR SENSING EXCESSIVE WEAR OR FAILURE OF MACHINE TOOL

This invention relates to the operation of machine tools, and more particularly to a method and apparatus for automatically stopping the operation of a machine tool and providing a warning signal to the operator thereof when excessive wear of the tool insert has occurred, or in the event that the tool insert breaks or otherwise completely fails.

Use of a worn-out machine tool insert, particularly in situations where the hard outer coating of the insert has worn off, can cause serious damage to the workpiece, or even the machine itself. This can be extremely costly and cause a good deal of wasted time particularly when a precision workpiece which has a substantial amount of work on it is involved. To obviate this problem, efforts have been made in the past to sense the incipient overwear of the tool insert so that such insert can be replaced before any damage to either the workpiece or the machine has occurred. One such prior art approach involves the use of thermocouples placed at or near the interface between the workpiece and the machine tool insert for sensing the generation of excessive heat which is a good indication of excessive wear. Such prior art thermocouple devices are described in U.S. Pat. No. 2,314,753 to Asimow; U.S. Pat. No. 1,876,712 to Maynard; U.S. Pat. No. 2,255,094 to Aeppli; and U.S. Pat. No. 2,991,654 to Engelhard. The use of such thermocouple temperature measurements have the disadvantage of relatively slow response and the lack of their accuracy of measurement. Other prior art approaches involve optical techniques such as pyrometry, infrared sensors and spectrometry. All of the last mentioned techniques tend to be overcomplicated in their implementations, particularly in machining environments. Further, these approaches all involve rather costly equipment which involve maintenance problems which can be particularly troublesome in a field of use such as that of machine tools. Further, in view of the nature of the equipment employed in such optical systems, it is difficult to obtain high reliability of operation. A commonly used prior art technique employs force measurements. Such approaches have the undesirable characteristic of interaction with the machine itself.

The apparatus and method of the present invention obviate the aforementioned shortcomings of the prior art in providing a simple and highly reliable means for sensing incipient failure of machine tool inserts or the sudden total failure thereof, and automatically cutting off operation of the tool. The system of the present invention lends itself to relatively economic construction and is of relatively simple design as compared with devices of the prior art.

The improved end results are achieved with the present invention by employing a pneumatic channel in the machine tool holder, this channel running from the machine tool insert, a pneumatic pressure being established in this channel to establish an air stream away from the insert by means of a pump or the like. A pressure transducer is connected in fluid communication with the channel so that it senses the pneumatic pressure therein. A signal processor is connected to receive the output of the pressure transducer, the output of the signal processor being fed to a control device capable of shutting the machine tool down and to a signalling device capable of producing a warning signal for the operator when the processor has a predetermined output. The pneumatic pressure in the channel changes abruptly when any one of several conditions occurs:

1. The temperature of the tool insert increases markedly. Such a temperture rise occurs when the outer coating of the tool insert starts to wear off to expose the underlying material (usually tungsten carbide). The heated air surrounding the workpiece is isostatic with the ambient pressure while outside the channel member. Once, however, it is within the channel, it equilibrates progressively to the temperature of the channel wall, once past the region near the insert which also somewhat follows insert temperature and thus also can heat the air. By so doing, the pressure is reduced as a function of its heated temperature. In this manner, a reduction in pressure is generated in accordance with the increase in temperature at the interface between the machine tool insert and the workpiece, thereby providing the needed control signal.

2. When the outer coating is worn off, the underlying material (typically tungsten carbide) tends to abrade against the workpiece producing miniature metal chips. These metal chips when introduced into the channel cause a decrease in the pneumatic pressure therein, resulting in the generation of a control signal. This occurs when the miniature metal chips sufficiently plug up a given orifice and thereby cause a sudden reduction in pressure. The orifice shape and suction can be thought of as an effective capture cross section for plug up which thus can be adjusted for the effect at a given flux of miniature chips. This will occur at a selected stage in the wear process.

3. With breakage of the tool or other total failure thereof, an abrupt change in pressure occurs in the channel due to the resultant physical disturbance to the air flow caused by insert temperature and miniature chipping incidental thereto.

It is therefore an object of this invention to provide a simple and highly reliable means for minimizing the damage to a workpiece with the failure of a machine tool insert.

It is a further object of this invention to sense incipient excess wear of a machine tool insert as a function of pressure changes occasioned by such wear.

It is still another object of this invention to provide means for automatically cutting off the operation of a machine tool when there is an incipient condition of excess wear thereof.

It is still a further object of this invention to provide means for automatically cutting off the operation of a machine tool in the event of breakage or other failure of the machine tool insert.

Other objects of the invention will become apparent as the description proceeds in connection with the accompanying drawings of which:

FIG. 1 is a functional block diagram of one embodiment of the system of the invention;

FIG. 5 is a graph illustrating the operation of the invention in response to an increased temperature effect;

FIG. 6 is a graphical illustration showing the operation of the invention in response to a plugged up channel effect with miniature chip production by the machine tool insert.

Figure 2A:
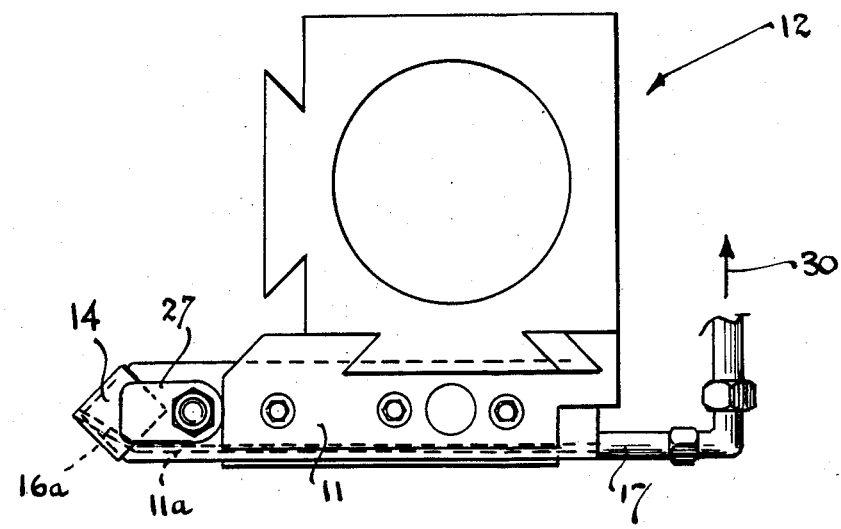
FIG. 2A is a top plan view showing a tool holder and tool insert which may be employed in the device of the invention.
Figure 2B:
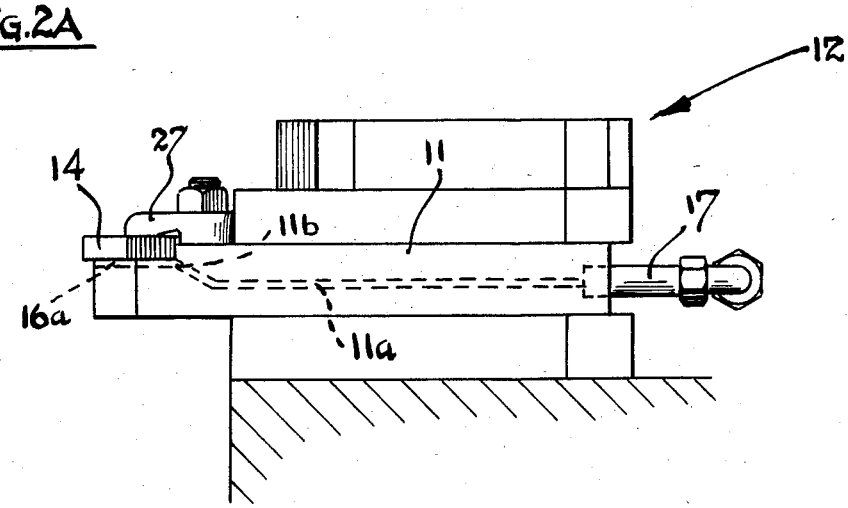
FIG. 2B is a side elevational view of the tool holder and tool insert of FIG. 2A.
Figure 3:
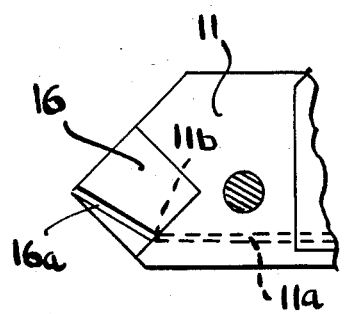
FIG. 3 is a view showing the tool holder of FIGS. 2A and 2B with the tool insert thereof removed.
Figure 4:
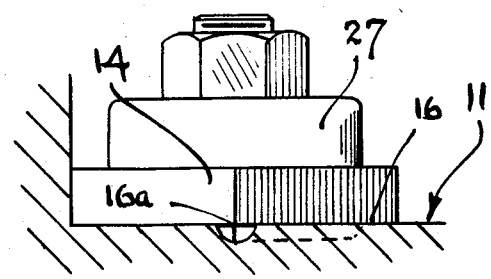
FIG. 4 is an end elevational view illustrating the tool insert installed in position.

It is to be noted that while the method and apparatus of the invention will be described in connection with a cutting tool, it can be used to equal advantage with all other types of machine tools and is not restricted in its application to that of the illustrative embodiment.

Referring now to FIG. 1, a functional block diagram of an embodiment of the invention is shown. Tool holder 11 of a machine tool 12 is shown with its tool insert 14 in engagement with a workpiece 15 to be machined. Machine 12 may comprise a lathe, milling machine, planer, shaper, drilling machine or the like, although the method of collection would change for the latter machine types in terms of location. However, the principle is the same. Tool holder 11 has a longitudinal channel 11a formed through the body thereof and a groove 11b formed in the shim underlining insert 14, this groove interconnecting with channel 11a. Tubing 17 provides fluid communication between the end of channel 11a and vacuum pump 19 through filter 20 and variable leak valve 21. Filter 20 may comprise a sieve filter for filtering out solid particles, while variable leak valve 21 is employed to adjust the fluid pressure in the line serving in efect as a calibration adjuster. Pressure transducer 23, which is shown in the illustrative embodiment as a differential type transducer, is connected to tubing 17 to receive a pressure signal from channel 11a with reference pressure input being provided by the direct output of vacuum pump 19. Thus, pressure transducer measures the differential between the direct output of the pump (line 18) and the pressure in line 17 which is in accordance with the pressure in channel 11a.

Pressure transducer 23 may comprise a commercially available device, such as the Model LX0603D transducer available from SenSym, Sunnyvale, Calif., or other equivalent devices capable of converting a low pressure pneumatic signal into an electrical signal. In a typical operative embodiment of the invention employing a cylindrical channel 11a having a diameter of 0.02", and using the aforementioned SenSym pressure transducer, variable leak valve 21 is adjusted to provide a differential "calibration" pressure input to pressure transducer 23 of the order of 375 torr, the pressure transducer having an output signal of about 4.5 v with an input of this magnitude. The electrical output of pressure transducer 23, which is a voltage in accordance with the pressure input signal to the transducer, is fed to signal processor 22. Signal processor 22 may comprise a simple analog circuit providing amplification and filtering of the DC input fed thereto, or may comprise a digital control circuit including an analog-to-digital converter with appropriate logic circuitry. In either event, a control signal is fed from signal processor 22 to actuate machine tool control device 24 whenever the input to the signal processor comes to a predetermined value representing excessive wear of tool insert 14 or total failure of such insert. Signalling device 26 may be employed in conjunction with control device 24 to provide a warning signal to the operator whenever excessive wear or breakage of the tool insert occurs. Machine tool control device 24 is connected to machine tool 12 to shut down operation of the tool whenever a control signal is received from the signal processor 22 indicating excessive wear or failure of the tool insert.

As mentioned earlier in the specification, an abrupt pressure change can occur in channel 11a in response either to excessive heat being generated at the interface between the tool insert and the workpiece, a plugging of the channel due to miniature chipping from abrasion of the workpiece by the exposed tungsten carbide in the tool insert, or interference with the flow in the channel due to a breakage of the tool insert which abruptly causes one or both of the preceding effects. Rise in temperature of the tool insert effects a rise in temperature of the air in channel 11a. The temperature of the gas in the tube equilibrates progressively to the temperature of the tube away from the insert and in so doing its pressure is reduced as a direct function of its initially heated temperature, thus providing a pressure output in accordance with the heating of the tool insert.

Figure 7:
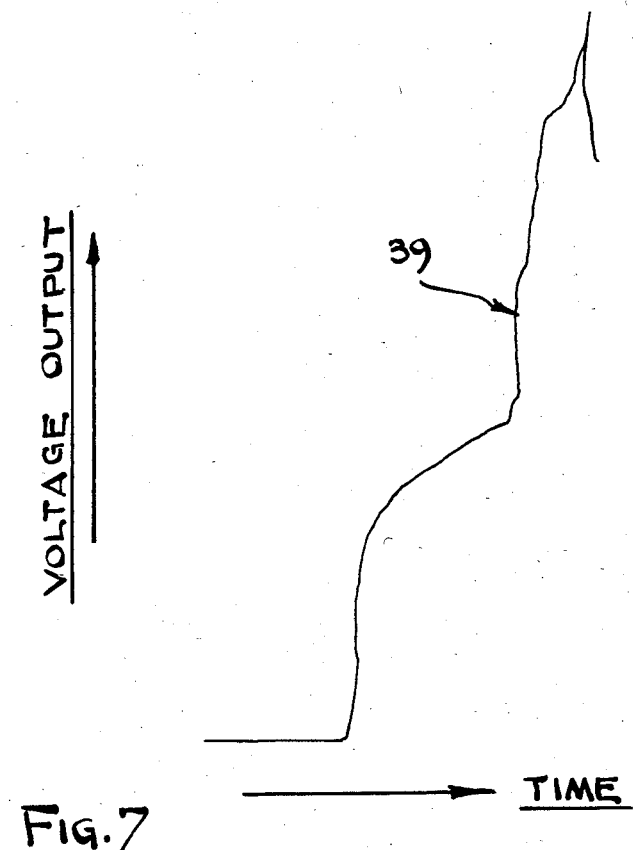
FIG. 7 is a graphical illustration showing the operation of the invention in response to a total failure of the cutting tool due to excessive cutting conditions.

As to be pointed out further in the specification in accordance with FIGS. 5–7 the change in gas pressure is typically an abrupt one, with either the plug-up effect, the thermal effect or on breakage of the tool, to provide an abrupt electrical signal when incipient excessive wear of the tool insert or breakage thereof occurs. In the case of signal processor 22 employing analog circuitry, the processor may include a differentiating circuit to provide a sharp pulse output to machine tool control device 24 and signalling device 26 in response to an abrupt pressure drop.

Referring now to FIGS. 2A, 2B, 3, and 4, an embodiment of the tool holder and tool insert of the invention is illustrated. Tool holder 11 has a channel 11a formed therein, this channel typically being of the order of 0.02" in diameter to form the appropriate effective capture cross section near the orifice. Pneumatic line 17 is connected to one end of channel 11, line 17 as already noted being pressurized to cause a flow of air in the direction indicated by arrow 30. The opposite end 11b of channel 11 exits into groove 16a formed in tool holder shim 16 (or in some cases an external chip breaker). Groove 16a runs out to the workpiece directly below tool insert 14 (or above in a chip breaker) so that in conjunction with the underface of insert 14 it forms an extension of channel 11a running directly to the workpiece-tool insert interface. The tool insert 14 is removably held in this position by means of clamp 27. It is to be noted that the loction for channel 11 shown in FIG. 4 only one example for this location and the channel can be otherwise located as application requirements may dictate for optimum operation.

Referring now to FIG. 5, a graph is shown illustrating a typical electrical output from pressure transducer 23 (FIG. 1) wherein an incipient failure of the tool insert is indicated by an abrupt increase in temperature. As can be seen from graph line 35, a sharp change in voltage occurs in the graph at point 35a signalling an abrupt increase in temperature due to the incipient failure of the tool insert.

Referring now to FIG. 6, the generation of a signal in response to plug-up effect in the channel is illustrated. As can be seen, at the point 37a of graph line 37, the voltage changes abruptly, this change in voltage being occasioned by a marked drop in pressure in channel 11 due to plug-up effect. The fact that this decrease in pressure is attributable to plug-up effect was verified by later visual inspection of the channel.

Referring now to FIG. 7, graph line 39 illustrates an abrupt change in transducer voltage output in response to a marked pressure drop due to total failure of the tool insert. As can be seen, such failure will result in the generation of a control signal which is capable of effecting the shutdown of the machine tool.

The device and technique of the invention thus provide means for effectively and reliably signalling the incipient excessive wear or failure of a machine tool insert to either automatically or by manual control enable the shutdown of the equipment before the workpiece or the equipment itself suffers damage.

While the invention has been described and illustrated in detail, it is to be clearly understood that this is intended by way of illustration and example only and is not to be taken by way of limitation, the spirit and scope of the invention being limited only by the terms of the following claims.

I claim:

1. In a machine tool having a tool holder and a tool which engages a workpiece to effect the machining thereof, said tool being mounted on said tool holder, the improvement whereby a control signal is generated indicating either the incipient failure or sudden total failure of said tool comprising
   channel means formed in said tool holder, said channel means having an inlet orifice formed at the region of engagement between the tool and workpiece said orifice inletting air from the ambient atmosphere,
   means for establishing an air stream entering the orifice in said channel means and running away from said region of engagement,
   means responsive to said air stream for generating a signal in accordance with the pressure of said air stream, and
   control means responsive to the last mentioned means for generating a control signal whenever the pressure of said air stream reaches a predetermined value.

2. The device of claim 1 wherein said means for generating a signal in accordance with said air stream comprises a pressure transducer for generating an electrical signal.

3. The device of claim 1 and further including means connected to said control means for automatically stopping the operation of said machine tool in response to said control signal.

4. The device of claim 3 and additionally including means connected to said control means for generating a warning signal in response to said control signal.

5. The device of claim 1 wherein said channel means includes a longitudinal channel formed through the body of the tool holder and a groove portion formed in the portion of the tool holder on which the tool is retained.

6. The device of claim 1 wherein the means for establishing an air stream in said channel comprises a vacuum pump connected to the channel.

7. The device of claim 1 and further including filter means for filtering out solid particles connected in said air stream between the channel means and the means for generating a signal in accordance with the pressure of the air stream.

8. The device of claim 2 wherein said pressure transducer is a differential transducer and further including variable leak valve means connected between said means for establishing an air stream and said transducer for calibrating the output of the transducer.

9. The device of claim 1 wherein said control means comprises a signal processor responsive to the output of said pressure transducer.

10. A method for generating a signal indicative of the temperature of a workpiece while it is being machined by a tool comprising:
    generating an air stream running away from the interface between the tool and workpiece, said air stream being formed from ambient air,
    channeling said air stream away from said interface,
    measuring the pressure of the air stream, predetermined changes in said pressure indicating changes in the temperature of the workpiece.

11. The method of claim 10 wherein a vacuum pump is employed to generate said air stream.

12. The method of claim 10 wherein the machine tool has a tool holder with a channel formed therein for retaining the tool, the air stream being channelled through said channel.

13. The method of claim 10 and further including the step of shutting down operation of the machine tool when said predetermined pressure drop is measured.

14. The method of claim 10 and further including the step of generating a warning signal when said predetermined pressure drop is measured.

15. In a machine tool having a tool holder and a tool which engages a workpiece to effect the machining thereof, said tool being mounted on said tool holder, the improvement whereby a signal is generated indicating changes in the temperature of said workpiece at its interface with said tool comprising:
    channel means formed in said tool holder, said channel means running to the region of engagement between the tool and workpiece and having an inlet orifice thereat;
    means for establishing an air stream from ambient air entering the orifice in said channel means and running away from said region of engagement, the pressure of said air stream varying in said channel in response to changes in the temperature of the workpiece at said interface;
    means responsive to said air stream for generating a signal in accordance with the pressure of said air stream, said signal being indicative of changes in the temperature of the workpiece.

* * * * *